US006961173B2

(12) United States Patent
Kinoshita et al.

(10) Patent No.: US 6,961,173 B2
(45) Date of Patent: Nov. 1, 2005

(54) VERTICAL FINE MOVEMENT MECHANISM OF MICROSCOPE

(75) Inventors: Kazuhiko Kinoshita, Aichi (JP); Megamu Shio, Kanagawa (JP)

(73) Assignee: Japan Science and Technology Corporation, Saitama (JP)

( * ) Notice: Subject to any disclaimer, the term of this patent is extended or adjusted under 35 U.S.C. 154(b) by 0 days.

(21) Appl. No.: 10/484,627

(22) PCT Filed: Jun. 13, 2002

(86) PCT No.: PCT/JP02/05923

§ 371 (c)(1),
(2), (4) Date: Jan. 23, 2004

(87) PCT Pub. No.: WO03/012519

PCT Pub. Date: Feb. 13, 2003

(65) Prior Publication Data

US 2004/0174590 A1 Sep. 9, 2004

(30) Foreign Application Priority Data

Jul. 26, 2001 (JP) ........................................ 2001-225307

(51) Int. Cl.[7] ........................... G02B 21/00; G02B 21/26
(52) U.S. Cl. ...................... 359/383; 359/368; 359/392
(58) Field of Search ................................ 359/368–384, 359/694–706, 425–426

(56) References Cited

U.S. PATENT DOCUMENTS 2,256,245 A * 9/1941 Hans ........................... 359/383

| 4,684,225 | A  | * | 8/1987 | Clark et al. ................. 359/379 |
| 5,024,513 | A  | * | 6/1991 | Hayashi ...................... 359/379 |
| 5,497,267 | A  | * | 3/1996 | Ishikawa et al. ............ 359/390 |
| 6,628,459 | B2 | * | 9/2003 | Ue .............................. 359/392 |

FOREIGN PATENT DOCUMENTS

| JP | 03-58011    | A1 |   | 3/1991  |         |
| JP | 05-145820   | A1 |   | 6/1993  |         |
| JP | 6-109963    |    | * | 4/1994  | ......... 359/384 |
| JP | 08-15466    | A1 |   | 1/1996  |         |
| JP | 2001-305432 | A1 |   | 10/2001 |         |
| JP | 2002-328309 | A1 |   | 11/2002 |         |
| JP | 2003-029162 | A1 |   | 1/2003  |         |

OTHER PUBLICATIONS

English translation of the Japanese reference No. 6–109963.*

* cited by examiner

*Primary Examiner*—Thong Q Nguyen
(74) *Attorney, Agent, or Firm*—Rader, Fishman & Grauer PLLC

(57) ABSTRACT

An optical microscope of high stability such that the image of a sample does not become obscure during observation, and no movement (drift) of an object point (object) occurs. The optical microscope is characterized by comprising vertical straight movement guide mechanisms (4 and 8) for an objective lens (6) of the microscope symmetrical to the optical axis, and fine adjustment units (10, 11 and 12) for the objective lens.

2 Claims, 5 Drawing Sheets

PRIOR ART

PRIOR ART

VERTICAL FINE MOVEMENT MECHANISM OF MICROSCOPE

FIELD OF THE INVENTION

This invention relates to a vertical fine adjustment mechanism (focusing mechanism) for optical microscopes including optical measuring instruments.

BACKGROUND OF THE INVENTION

A mechanism in which the objective lens moves vertically along the Z-axis is frequently used as the focusing mechanism in conventional optical measuring instruments and optical microscopes.

The structure of conventional microscopes is described briefly referring to the drawings. FIG. 4 is a side view of the principal part of a microscope and FIG. 5 is a plan view of it. In the drawings, (101) is a stand, (102) is a support mounted on the stand (101) for free vertical movement, (103) is a revolver for the objective lens mounted on the support, and (104) is the objective lens mounted on the revolver. At the support (102), a V-groove (105) for a vertical straight movement guide mechanism is formed on both sides as shown in FIG. 5, and opposite to this groove, a V-groove (106) for a vertical straight movement guide mechanism is formed on the stand (101), and a roller or a ball (107) is held between these two grooves. Also, a rack (108) is mounted on the support (102), a shaft (110) with a pinion (109) engaging this rack (108) protrudes from the stand, and an operation handle that is not shown is mounted on this protruded portion. When this operation handle is rotated, the pinion (109) is rotated through the shaft (110), the rack (108) mounted on the support (102) moves vertically, and also the support (102) moves vertically at the same time, allowing the objective lens (104) mounted on the revolver (103) to be focused.

In the conventional microscopes described above, however, since one end of the one side support type support (102) that is asymmetrical with respect to the center of the optical axis is moved vertically for fine adjustment by means of the rack-and-pinion mechanism, the vertical fine movement mechanism is remarkably asymmetrical and the operation is unstable. Variations in environmental temperature, in particular, cause fluctuations of the center of the optical axis, resulting in the unstable image. Since drift due to temperature changes occurs in such a vertical fine movement mechanism, this mechanism cannot be currently used for molecular position measurement or molecular motion measurement.

This invention is therefore intended to solve the above problem by realizing an optical microscope of high stability in which the image of the viewed sample does not become out of focus during observation and no movement (drift) of the object point (object) occurs.

DISCLOSURE OF THE INVENTION

The above objectives of the present invention are achieved by a vertical fine adjustment mechanism for microscopes comprising a triple cylinder, namely an external cylinder, an intermediate cylinder, and an intermediate internal cylinder to which an objective lens can be mounted, with said intermediate cylinder and internal cylinder equipped with vertical straight movement guide mechanisms in equally divided directions on the circumference and with said internal cylinder equipped with a means of vertical fine adjustment, wherein said means of vertical fine adjustment is equipped with an interlock pin installed in the intermediate cylinder inverted L-shaped hardware that contacts the interlock pin and moves it vertically, and an actuator that actuates the inverted L-shaped hardware. Said means of vertical fine adjustment is equipped with an interlock pin (10) installed in the intermediate cylinder (7), inverted L-shaped hardware that is brought into contact with the interlock pin and moves it vertically, and an actuator that actuates the inverted L-shaped hardware.

Also, in the vertical fine adjustment mechanism for microscopes, two of said interlock pins may be configured so that uniform strain is applied to both.

Also, in the vertical fine adjustment mechanism for microscopes, said actuator may be a micrometer head.

DETAILED DESCRIPTION OF THE PREFERRED EMBODIMENTS

Figure 1:
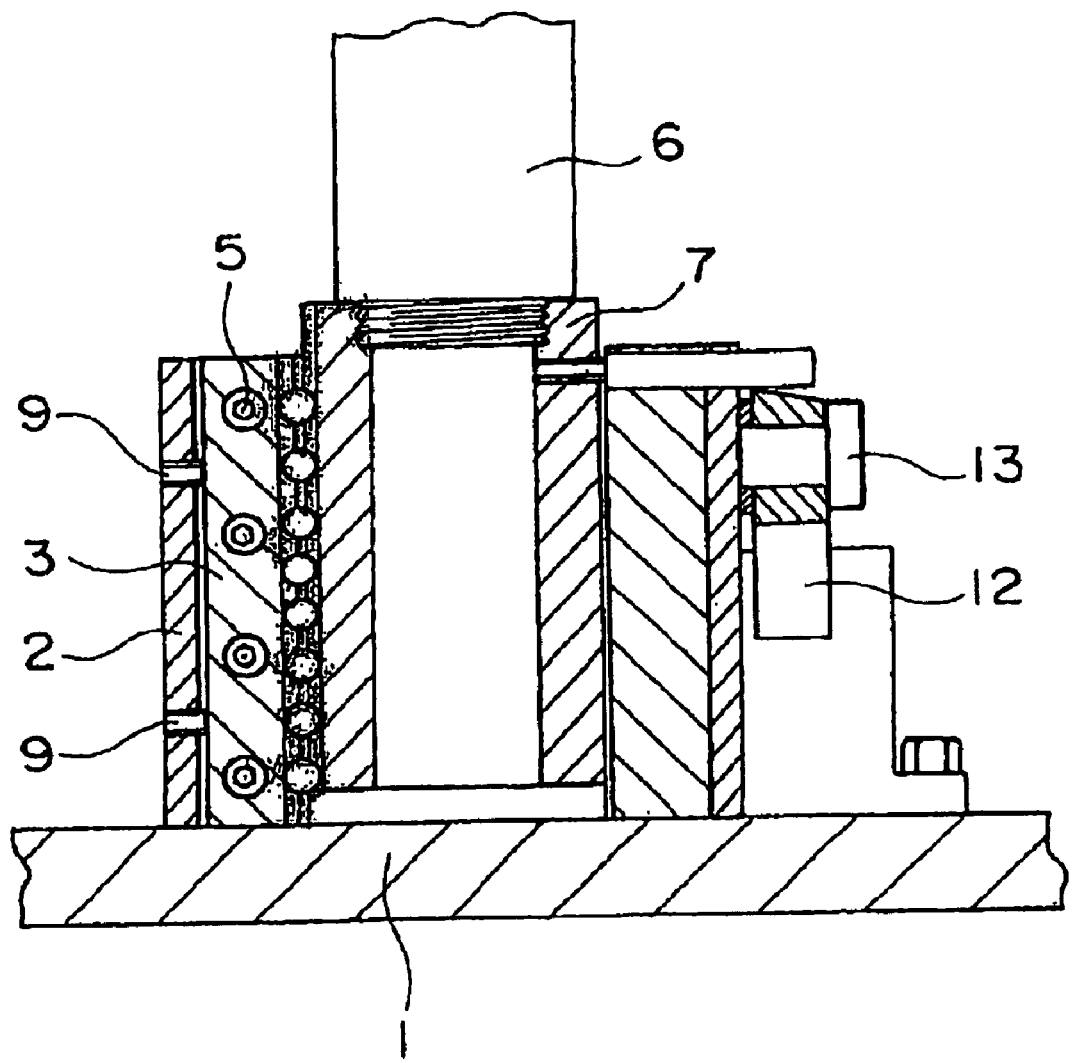
FIG. 1 is a sectional view of the principal part of a microscope relating to the first embodiment of this invention.
Figure 2:
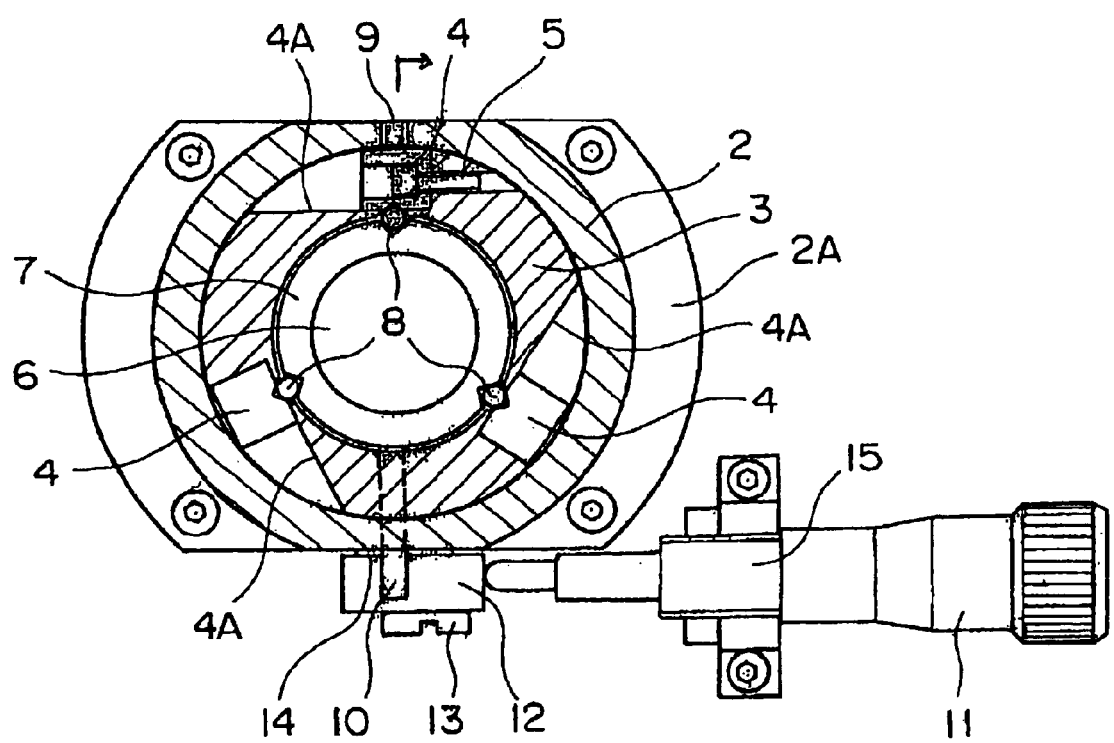
FIG. 2 is a plan sectional view of the same microscope.
Figure 3:
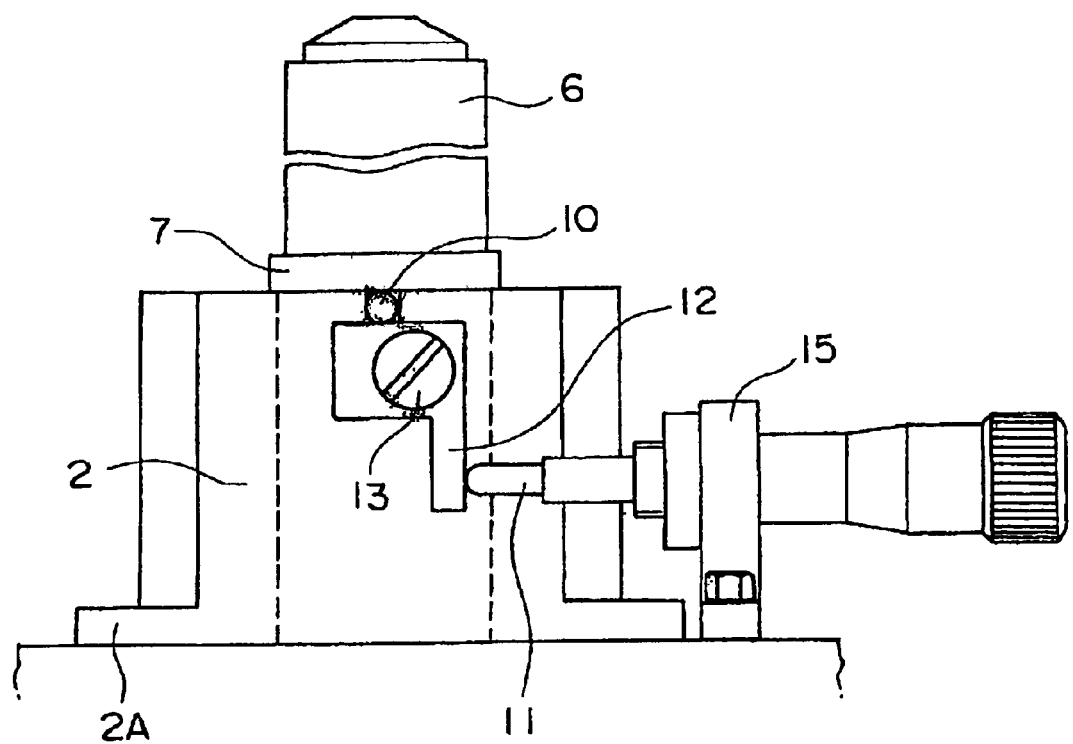
FIG. 3 is a side view of the same microscope
Figure 4:
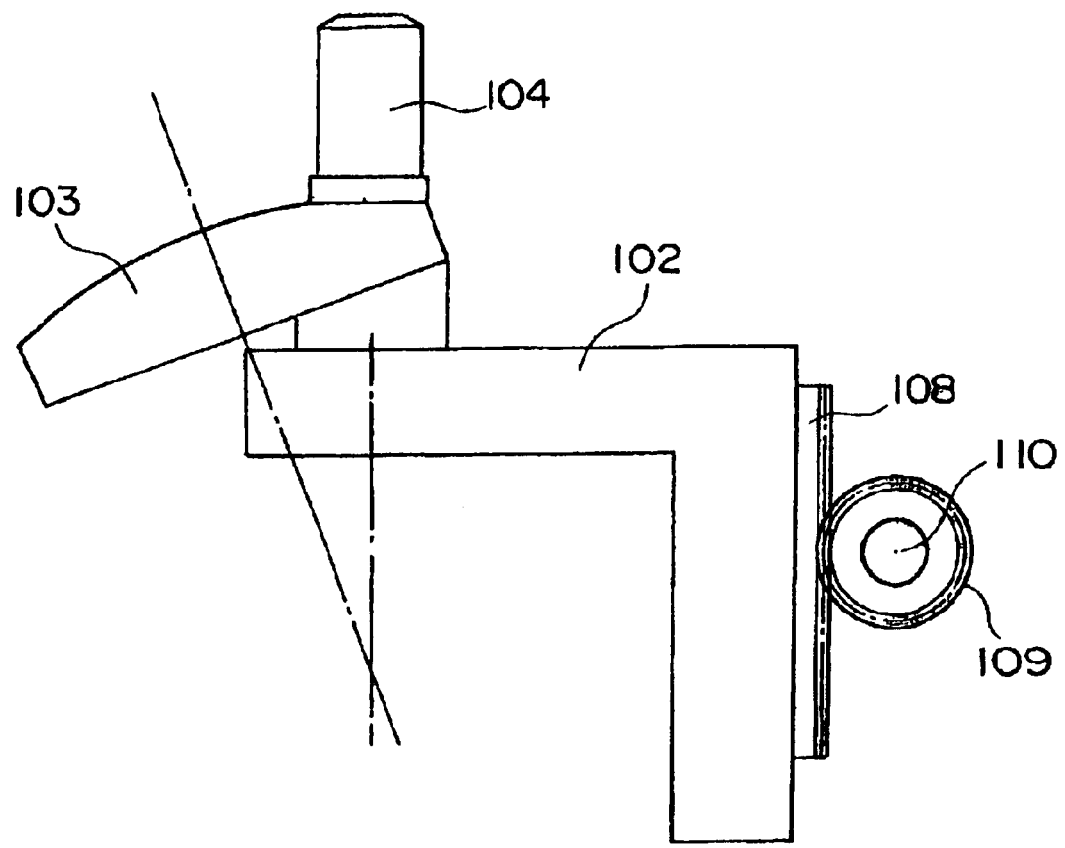
FIG. 4 is a side view of the principal part of a conventional microscope.
Figure 5:
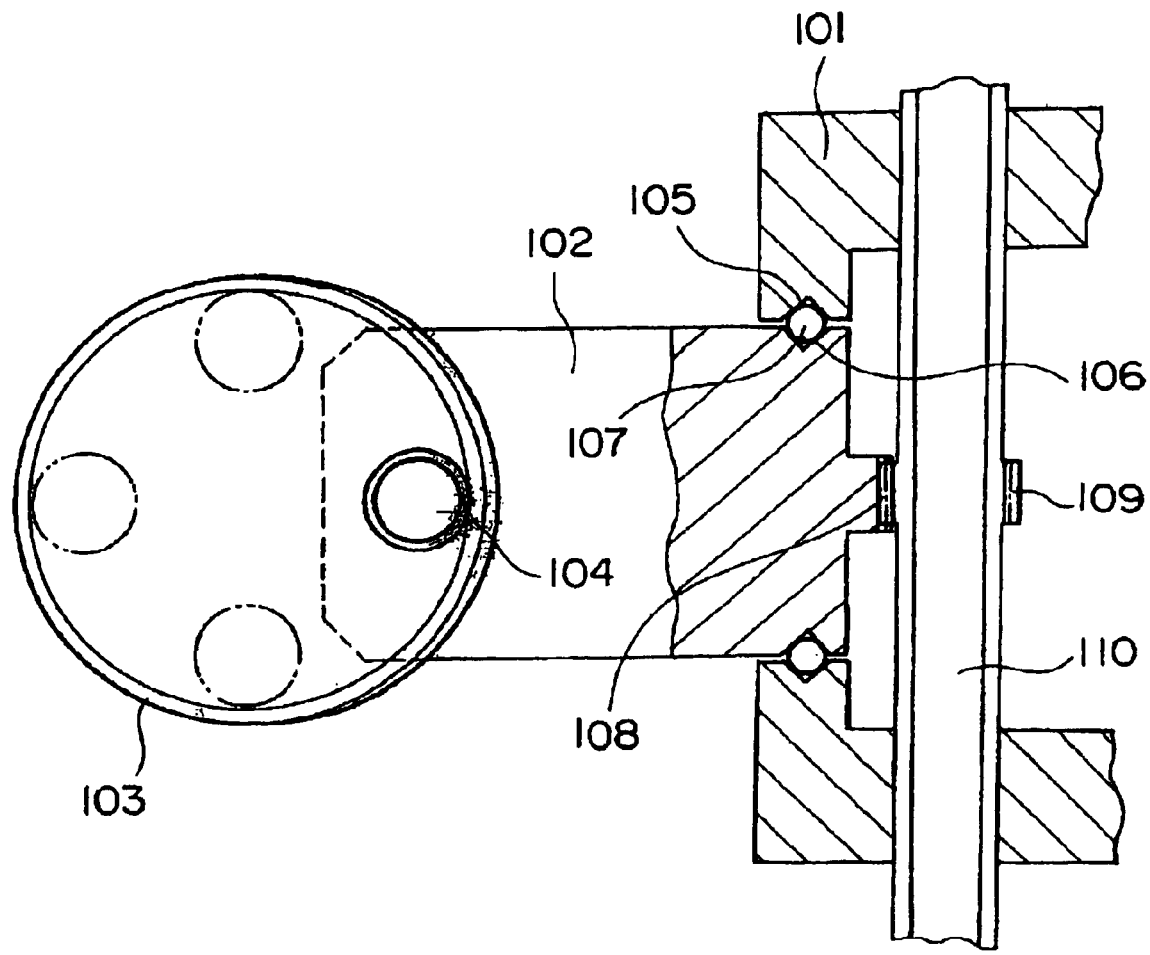
FIG. 5 is a plan view of the principal part of a conventional microscope.

The embodiments of the vertical fine adjustment mechanisms for microscopes relating to this invention are described with reference to the drawings. FIG. 1 is a side sectional view of said microscope, FIG. 2 is a plan sectional view of the same microscope, and FIG. 3 is a side view of the same microscope.

In the drawings, an external cylinder (2) that has a concentric inside diameter and outside diameter around the central axis is mounted vertically on the substrate (1). At the lower part of the external cylinder (2), flange (2A) for fastening is formed, and in the inside diameter of the external cylinder (2), an intermediate cylinder (3) is incorporated with very small clearance. Parallel cut-out surfaces (4A) that are parallel to the central axis of this intermediate cylinder (3) and set at equal distances from this central axis are prepared at 120 degree intervals, and V-shape groove straight guide hardware (4) is mounted on these cut surfaces so that the hardware can be tightened with fastening screws (5). On the equally three-divided portions of the inner circumference of the intermediate cylinder (3), a rectangular window is opened in which a roller or a ball (8) rolls. On the equally three-divided portions of the outer circumference of the internal cylinder (7) to which the objective lens (6) of the microscope can be mounted by screwing it on, a V-groove in which a roller or a ball (8) rolls is cut.

A vertical straight movement guide mechanism (three-directional straight guide mechanism) with a hollow shaft (optical axis) is configured by assembling these parts. In addition, this mechanism can be configured so that two of the three V-grooves formed in equally three-divided portions of the outer circumference of the internal cylinder (7) are square grooved (that is, the groove surface is flat), the relevant parts of the intermediate cylinder (3) are planes parallel to the central axis, and a roller is incorporated between them. In this configuration, although symmetry is slightly impaired, the stability is not affected and the manufacturing cost can be reduced.

Also in this configuration, the V-shaped groove straight guide hardware (4) is fastened with screws (9) on the outer circumference of the external cylinder (2) at 120 degree intervals to prevent unstable movement of the intermediate cylinder (3), and to enable pressure to be applied to the roller or the ball (8).

The mechanism for applying pressure is not limited to the screws (9) described above, and the following configuration can also be adopted. If operating temperature fluctuations exceed several degrees, even if material of the same thermal expansion coefficient is used, for example, for the intermediate cylinder (3) and the internal cylinder (7), some fluctuation may occur, resulting in fitting instability that exceeds deformation levels due to pressure or excessive pressure. In this case, a configuration can be adopted in which coil springs and spring housings are prepared in place of the screws (9) on the external cylinder (2), or plate springs are inserted between the intermediate cylinder (3) and the V-shaped groove straight guide hardware (4), to absorb the fitting instability caused by operating temperature fluctuations while maintaining the symmetry. Also, a coil spring can be used as the spring, and other types of springs that can achieve a similar function can be used in place of the plate spring.

On the other hand, the vertical fine movement mechanism can be comprised of a means of fine adjustment that is comprised of the interlock pin (10), the micrometer head (11), and a lever with inverted L-shaped hardware. The interlock pin (10) is mounted on the internal cylinder (7) to which the objective lens (6) is mounted, and one side of the inverted L-shaped hardware (12) is brought into contact with this interlock pin. The inverted L-shaped hardware (12) is supported for free rotation in both directions through the washer (14) by the fixed shaft (13) that is mounted on the outer circumference of the external cylinder (2), and the other side of the inverted L-shaped hardware is brought into contact with the micrometer head (11). The micrometer head (11) is mounted with the micro-fixing hardware (15) so that its height is aligned with that of the inverted L-shaped hardware (12), and the operation of the micrometer head (11) allows one side of the inverted L-shaped hardware (15) to be pressed, the other side of the inverted L-shaped hardware to be moved upward accordingly, and the interlock pin (10) to be pushed up to move the internal cylinder (7) upward with fine adjustment. Also, the rotating section of the inverted L-shaped hardware can be equipped with a return spring if appropriate to enable it to be restored to its initial state. In addition, for the micrometer head (11), another actuator with a gear motor can be used. Also, the level of fine adjustment can be set freely by adjusting the length of each side of the inverted L-shaped hardware.

The preferred embodiments of this invention are as described above. However, the vertical straight movement guide mechanism is not necessarily limited to three directions, and other numbers of directions are possible. Also, other types of vertical fine movement mechanisms that can realize similar action can be used by changing the shape of the grooves and the roller.

In addition, this invention can be embodied in many forms without deviating from its purpose or principal features. The preferred embodiments described herein are therefore only examples in all respects and should not be construed to imply limitations.

INDUSTRIAL APPLICABILITY

The straight guide mechanisms of this invention have symmetrical structures with respect to their weight and shape, and therefore, a microscope focusing mechanism with very good balance and high stability is achievable.

Since a highly stable optical microscope is realized, measurement of molecular position and molecular motion on the order of nanometers in the fields of molecular biology and biophysics can be easily performed. If an actuator operated on the order of 0.1 micrometer per pulse that has the high degree of straightness and low torque required for vertical fine movement is used at the micrometer head (10) in the straight guide mechanism, the leverage enables a highly precise and low-cost vertical fine movement mechanism capable of achieving resolutions of 0.02 $\mu$m or less.

These effects can be achieved as described above.

What is claimed is:

1. A vertical fine adjustment mechanism for microscopes comprising a triple cylinder, namely an external cylinder, an intermediate cylinder, and an intermediate internal cylinder to which an objective lens can be mounted, with said intermediate cylinder and internal cylinder equipped with vertical straight movement guide mechanisms in equally divided directions on the circumference and with said internal cylinder equipped with a means of vertical fine adjustment, wherein said means of vertical fine adjustment is equipped with an interlock pin installed in the intermediate internal cylinder, inverted L-shaped hardware that contacts the interlock pin and moves it vertically, and an actuator that actuates the inverted L-shaped hardware.

2. The vertical fine adjustment mechanism for microscopes according to claim 1, wherein said actuator is a micrometer head.

* * * * *